Sept. 5, 1967 J. O. ELLIOTT 3,340,449
INDUCTION MOTOR BRAKING SYSTEM
Filed Jan. 29, 1965 2 Sheets-Sheet 1

INVENTOR.
James O. Elliott
BY
Albert N. Reuther
His Attorney

__United States Patent Office__  3,340,449
Patented Sept. 5, 1967

3,340,449
INDUCTION MOTOR BRAKING SYSTEM
James O. Elliott, Xenia, Ohio, assignor to General
Motors Corporation, Detroit, Mich., a corporation of
Delaware
Filed Jan. 29, 1965, Ser. No. 428,945
1 Claim. (Cl. 318—212)

This invention relates to safety for power tool use and, more particularly, to an improved grinder-polisher electric braking system instantaneously effective to stop rotation of a shaft-mounted tool.

A problem exists with danger of injury due to continued rotation of a rotating tool such as a grinder wheel, polishing or buffing wheel, wire wheel and the like installed on an electric grinder motor mount. This is particularly a safety feature for use on deluxe grinder means which come equipped with dual motor winding arrangement. A need exists for a dynamic braking feature for such deluxe grinder means and an object of the present invention is to provide improved circuit arrangement with components effective to provide both normal operation and electric braking therewith.

Another object of this invention is to provide a power-tool motor braking system using a pair of diodes and switch means instantaneously effective to utilize series-connected motor winding portions for braking though normally there is parallel connection of the motor winding portions as to each other.

Another object of this invention is to provide in combination a pair of motor winding portions normally in parallel with each other and switching means for changing to the series connection of the winding portions and a diode means for supplying rectified half wave power thereto accompanied by reversal of polarity during electric braking thereby of a motor means.

Further objects and advantages of the present invention will be apparent from the following description, reference being had to the accompanying drawings wherein preferred embodiments of the present invention are clearly shown.

Figure 1:
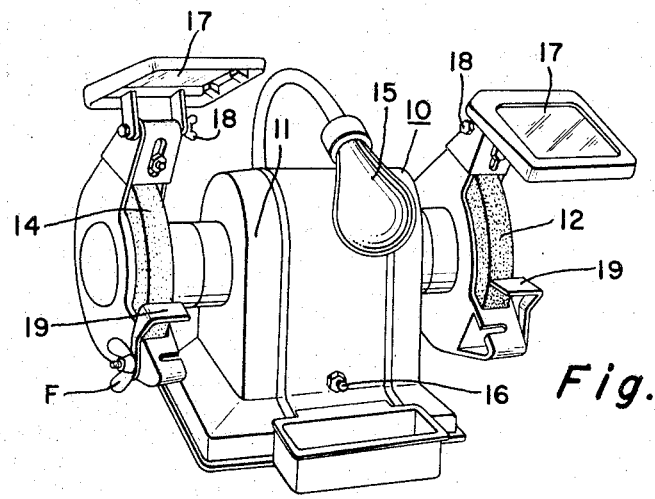
FIGURE 1 illustrates a power-tool motor means having features in accordance with the present invention.

In FIGURE 1 there is shown in perspective a power tool means generally indicated by numeral 10 including a centrally mounted motor 11 as well as opposite tools such as a grinding wheel 12 and a polishing or buffing attachment 14 carried on a shaft extending in opposite directions from the motor means 11. A suitable lamp or illuminating means 15 can be provided centrally and electrically energizable with the motor means by way of a switch 16. Each of the tool portions such as the grinding wheel 12 and buffing or polishing wheel 14 can be provided with a shield structure 17 made adjustable by a screw and nut fastening means 18. Also each work location can be provided with an adjustable tool rest means 19 having a substantially L-shaped configuration and secured by a fastening screw-nut means designated by a reference F such that positioning of a platform of the adjustable tool rest can be varied in accordance with the fastening adjustment. Each of the tool rest 19 can have a cast aluminum clamping provision and such mounting can include a slot to further facilitate radially inner inwardly and outwardly adjustment of the tool rest 19.

Figure 2:
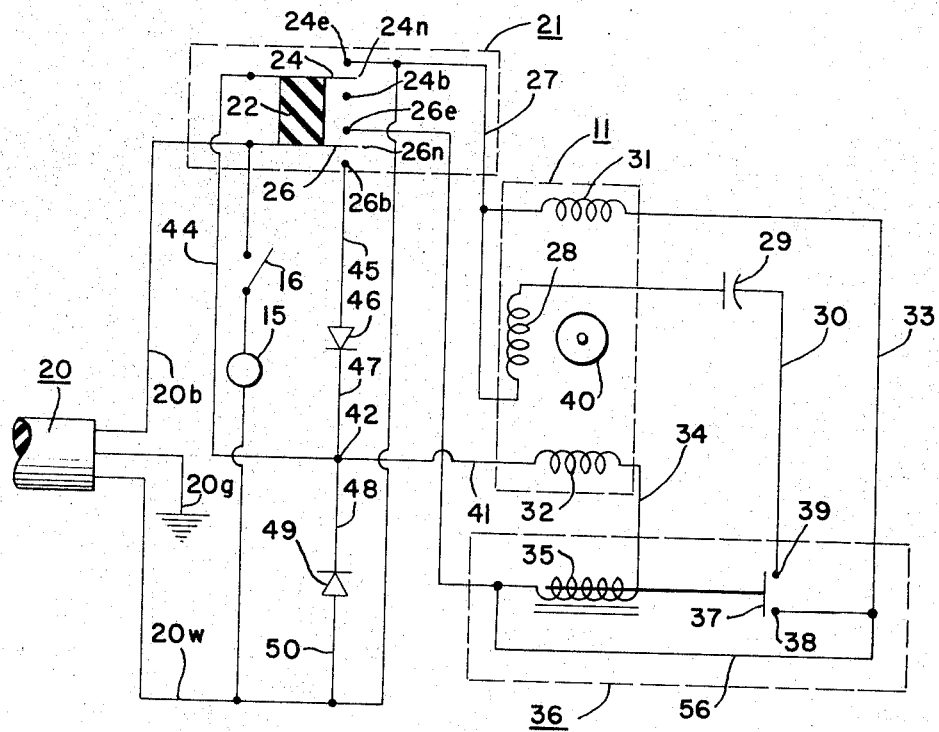
FIGURE 2 is a circuit diagram of electrical features in accordance with the present invention on a capacitor start type of motor means.

Referring now to FIGURE 2 of the drawings, there is shown a power supply wiring generally indicated by numeral 20 having conductors or suitably insulated leads 20b, 20g and 20w extending therefrom. The conductor or lead 20g is a ground wire as a normal safety precaution and the leads or conductors 20b and 20w are joined to a switching means generally indicated by numeral 21. This switching means 21 includes several pairs of contact or terminal means as well as a movable lever or switch arm portion 22 carrying a pair of pivotal or shiftable blade portions 24 and 26. The lead or conductor 20b is connected directly to the blade portion 26 which is insulated from the blade portion 24 by the switch arm means 22. However, the blade portions are jointly movable. The switch means 21 can be separate from the switch means 16 for lamp 15 noted earlier and connected directly across supply leads or conductors 20b and 20w as shown in FIGURE 2.

The switch means 21 provides a central positioning for neutral or off locations 24n and 26n respectively. For normal operation of a motor means electrically energizable from the power supply lines there are terminal or contact locations 24e and 26e representing electrically energized connection of the movable switch blades 24 and 26 respectively as a two-pole double-throw switch portion establishing interconnection of winding portions of motor means 11 in a predetermined manner. A conductor or insulated lead 27 has a common connection to a phase winding portion 28 in series with a capacitance or impedance means 29 and a lead 30. The conductor 27 also is connected to one end of a main winding portion 31. The motor means 11 also includes a further or second main winding portion 32. A lead 33 is connected to the main winding portion 31 at an end thereof opposite to that which the conductor 27 is connected. A lead or connector 34 is secured to one end of the main winding portion 32 and a coil portion 35 of a current relay means 36 having a shiftable switch arm 37 operable therewith is provided for normally closed contacts engagement with contact means 38 and 39 being bridged by the switch arm 37 during starting operation of the motor means when the phase winding portion 28 together with the series impedance means 29 is energized. A rotor means 40 is shown in FIGURE 2 with the motor means 11 and it is to be understood that this rotor means is carried by a shaft on which the tool such as the grinding wheel 12 and polishing or buffing wheel 14 can be mounted. When current magnitude through the coil 35 attains a predetermined value the switch arm 37 is retracted from bridging the contacts 38 and 39 and the motor continues to operate with the main winding portions 31 and 32 normally in parallel with each other due to connection of the main winding portion 32 by way of a lead 41 to a juncture 42 and a further lead 44 connected to the switch blade portion 24 of the switch arm 22 in switch means 21. At the time the switch blade portion 24 engages the energizing terminal portion 24e the switch blade portion 26 engages the terminal portion 26e thus connecting the main winding portions 31 and 32 in parallel and also permitting energization of lamp 15 subject to closing of the lamp switch 16 in the circuitry of FIGURE 2.

The switch arm 22 shifted in a direction to de-energize the motor power supply results in movement through the central or neutral positioning and then in an opposite direction such that the switch blade 24 engages an open terminal position 24b corresponding to movement of the switch blade or arm portion 26 into engagement with a terminal portion 26b establishing connection to a lead 45 attached to a diode or rectifier means 46 having further connection by way of a lead 47 to the juncture 42.

Connected across main winding portions 31 and 32 is a second diode 49 through leads 50 and 27 and leads 48 and 41, respectively. Movement of the switch blade portion 26 into engagement with the terminal portion 26b of the switch means 21 is for the purpose of electric braking and the switch means in effect is a single-pole single-throw switch for this purpose.

The movement of the switch arm into the electric braking position can be opposed by a resilient biasing or spring means (not shown) for return of the switch arm to a central or neutral positioning noted earlier. However, so long as the switch arm 22 is held or forced manually by an operator into the braking position, there is established an instantaneous reconnection of the main winding portions 31 and 32 of the motor means 11 to be in series with each other and diode 46 whereby winding portions 31 and 32 have reverse polarity during the electric braking established by this connection. Thus instantaneously the switch arm 26 engages the terminal means 26b and current can pass through diode 46 and main winding portions 32 and 31 which are now connected in series across supply lines 20b and 20w through a circuit which may be traced from supply line 20b through terminal 26b, lead 45, diode 46, lead 47, juncture 42, main winding portion 32, lead 34, coil portion 35, lead 56, lead 33, main winding portion 31 and lead 27 to the opposite supply line 20w. Thus there is no motor operation possible and the reversal of polarity and power supply through the one main winding portion 32 results in a bucking of flux emanating from the winding portion for quickly stopping the rotation of the rotor 40 which carries the tools such as the grinding wheel, polishing or buffing wheel and the like. Circuitry required is reduced to a minimum and also the switching is appreciably reduced since in effect only the switch means 21 having the single-pole single-throw switch portion operable in one direction and a two-pole double-throw switch means operable in an opposite direction is all that is needed so far as the motor operation and electric braking thereof is concerned.

It is to be noted that the motor means 11 can have the main winding portions 31 and 32 wound in a manner similar to that which would be used for a dual voltage motor means. However, the dual voltage feature of such motor means need not be used per se though it would be available with a minor reconnection of certain leads. The connection previously described would be for 110 volt power supply for example. However, to convert to 220 volt power supply and operation of the motor means it would be possible to reconnect the conductor 44 to the conductor 33 on the current relay means 36 where a conductor 56 serving as a jumper would be removed and discarded temporarily during 220 volt operation. Also the diode means 49 would be disconnected by the conductor 50 being attached to an upper pole or terminal means such as 26e of the switching means 21. Under such circumstances the braking will draw double current value in conjunction with the 230 volt or dual voltage energization. However, this dual voltage reconnection is entirely optional and the particular advantage of the circuitry of FIGURE 2 is that the first and second main winding portions 31 and 32 can be connected in parallel during normal motor operation and are reconnected to be in series with each other with polarity reversed during electric braking.

Figure 3:
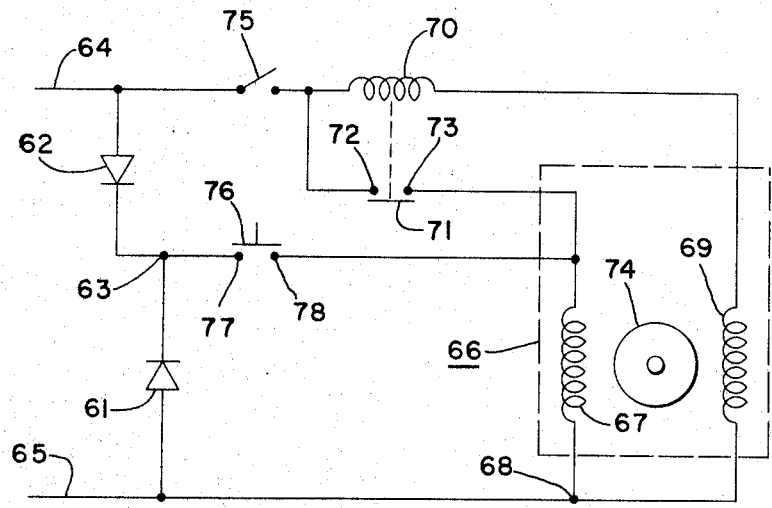
FIGURE 3 is a circuit diagram of another embodiment of the present invention.

In FIGURE 3 there is another circuit arrangement for a motor braking system. A pair of main winding portions are used for multiple purposes in a motor means generally indicated by numeral 66 in the embodiment of FIGURE 3. One winding portion 67 is connected at a common junction 68 with another winding portion 69 supplied with power by way of the line 65. A current coil portion 70 having a relay arm 71 movable in accordance with energization of the coil effects bridging of contacts 72 and 73 in series with the winding portion 67. These contacts 72 and 73 are bridged or closed during starting operation for motor means 66 having a rotor 74 carried by a shaft on which power tool portion such as a grinder wheel, buffing means and the like can be provided. A main on and off switch means 75 is provided in series between the power line 64 and coil portion 70 of the relay means. The relay contact portion is normally open. Thus the closing of the switch 75 results in energization of the relay means thereby closing the contacts for starting due to the high in-rush current. The relay contact portions open after the motor speed is such that the coil current can no longer keep the relay energized sufficiently for that purpose. Connected in series with diode 62 and one end of winding portion 67 are normally open contacts 77 and 78 which may be bridged by a contact arm 76. Connected across winding portion 67 is another diode 61 through normally open contacts 77 and 78 and juncture 68. Motor 66 may be braked electrically by closing contact arm 76 across normally open contacts 77 and 78 which connects diode 62 in series with winding portion 67 across supply lines 64 and 65 and completes a circuit for diode 61 across winding portion 67. The circuitry of FIGURE 3 provides an electric motor braking system using two diodes and switching means. The FIGURE 2 circuitry for capacitor start motor means can operate at lower voltage such as 110–120 volts whereas the features of FIGURE 3 can be used at higher voltage values of 220–240 volts or more.

Figure 4:
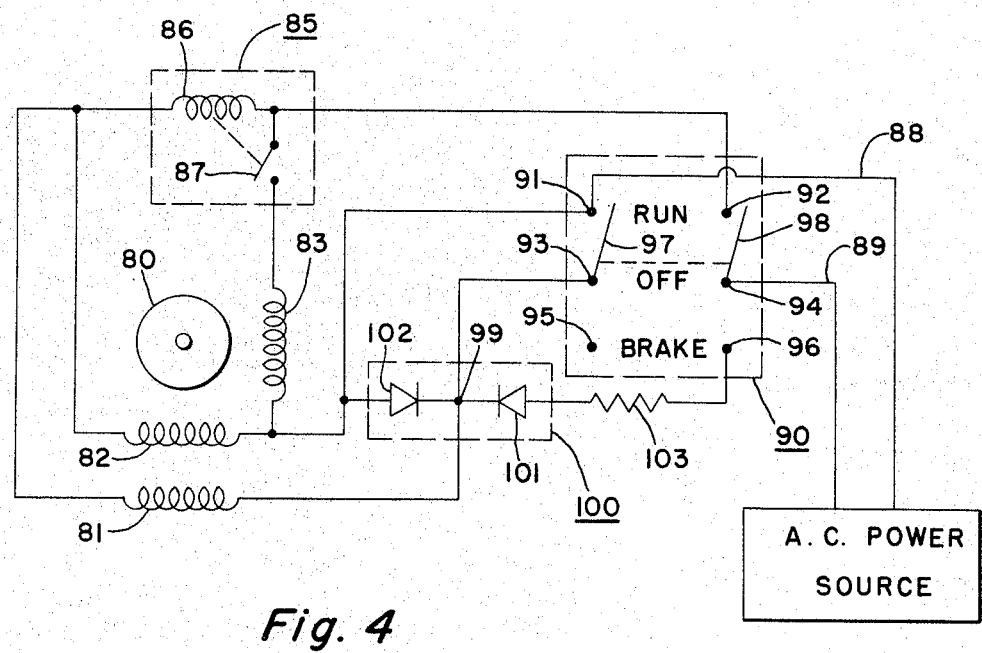
FIGURE 4 is a circuit diagram of electrical features in accordance with the present invention on a split-phase motor means.

FIGURE 4 circuitry represents features of the present invention used with a split-phase motor means having a rotor 80, main winding portions 81 and 82 as well as a phase winding portion 83. A relay means generally indicated by numeral 85 has a coil portion 86 in series at one end of a juncture of the winding portions 81–82. A relay switch member 87 is movable in accordance with energization of coil portion 86 and can open or close a series connection to phase winding portion 83. A pair of supply lines 88 and 89 connect from a suitable AC source to a double-pole double-throw switch means generally indicated by number 90. This switch means has contact means 91, 92, 93, 94, 95 and 96 as indicated in FIGURE 4. Lines 88 and 89 connect to contact means 91 and 94 respectively. A pivotable switching member having arms 97 and 98 always extending from contact means 93 and 94 respectively can be shifted to a "run" position in which contact means 91–92 are engaged thereby or into a "brake" position in which contact means 95–96 are engaged. Energization of the split phase motor means during "run" positioning results in operation in a well known manner. Power from the AC source passes through a juncture 99 and to windings as well as the relay means. However, upon movement of the movable switching member into "brake" positioning there is no longer any power supply to the relay means 85 and phase winding portion 83. The arm 97 is removed from engagement with contact means 91 and can engage an open contact means 95. Simultaneously the arm 98 is in bridging position across contact means 94 and 96.

Connected between contact means 96 of switch 90 and juncture 99 is the series combination of an impedance resistor 103 and a diode 101. Another diode 102 is connected across main winding portions 81 and 82, as indicated. The impedance or resistance means when provided is added for the purpose of prolonging switch contact life on contact means 91 and 96. However in some installations this impedance or resistance means can be left off or a differing size or rating thereof can be used depending upon response and protection being sought. In any event, the diode or rectifier means 101 serve to convert AC power from the source into direct current applied to only the main winding portions 81 and 82 effectively in series with each other during braking though normally the main winding portions 81 and 82 are in parallel during running operation of the split phase motor means.

Impedance value of the main winding portions in series is double that of the winding portions in parallel. Thus during braking a reduced current value is flowing in only the main winding portions and for diode or rectifier protection the impedance or resistance means 103 is also added in series with one supply line to the circuitry of FIGURE 4. The ampere-turns for braking can be controlled to some extent externally by use of the impedance or resistance means as to total current flow though only the turns of the main winding portions in series are utilized internally of the split-phase motor means. Thus there is a stronger polarized field of magnetic flux to slow the rotor means effectively during braking.

While the embodiments of the present invention herein disclosed constitute preferred forms, it is to be understood that other forms might be adopted.

What is claimed is as follows:

An induction motor braking system comprising in combination with a single phase induction motor having at least first and second main windings and input circuit means suitable for connection across a source of alternating current supply potential, two diodes, means for connecting one of said diodes across said first and second main windings and switching means operable between at least first and second positions for connecting said first and second main windings in parallel across said input circuit means when in a selected one of said first and second positions and for connecting said first main winding, said second main winding and the other one of said diodes across said input circuit means when in the other one of said positions.

References Cited
UNITED STATES PATENTS

| | | | |
|---|---|---|---|
| 1,912,463 | 6/1933 | Ploeger | 318—221 |
| 2,181,734 | 11/1939 | Mooney. | |
| 2,791,735 | 5/1957 | Norman | 318—212 X |
| 2,922,097 | 1/1960 | Choudhury | 318—212 |
| 3,011,112 | 11/1961 | Mowery | 318—212 |
| 3,071,719 | 1/1963 | Latter | 318—221 X |
| 3,281,632 | 10/1966 | Ozaki | 318—212 X |

ORIS L. RADER, *Primary Examiner.*

G. Z. RUBINSON, *Assistant Examiner.*